(No Model.) 3 Sheets—Sheet 3.
J. LEEDE.
GAS APPARATUS.
No. 588,154. Patented Aug. 17, 1897.
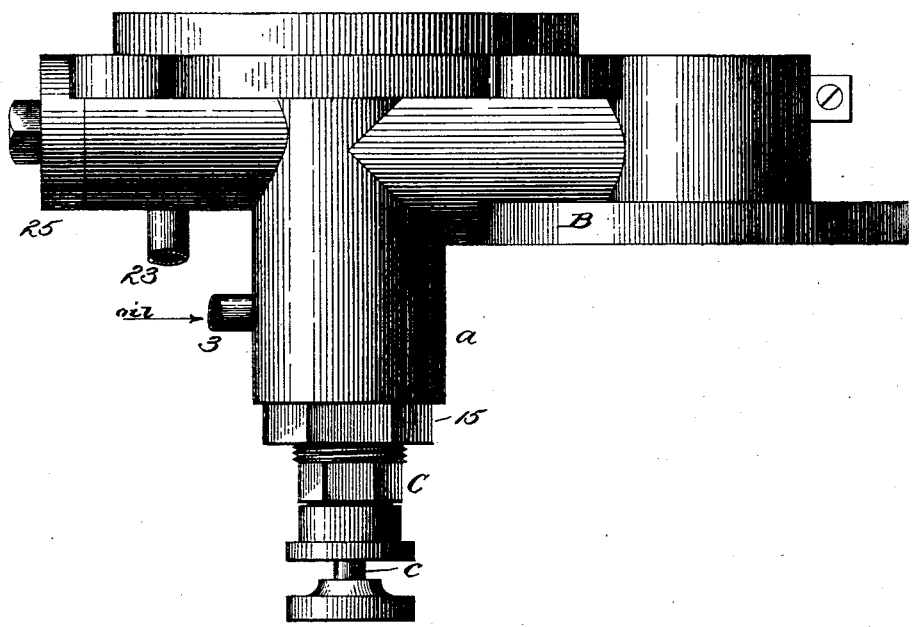
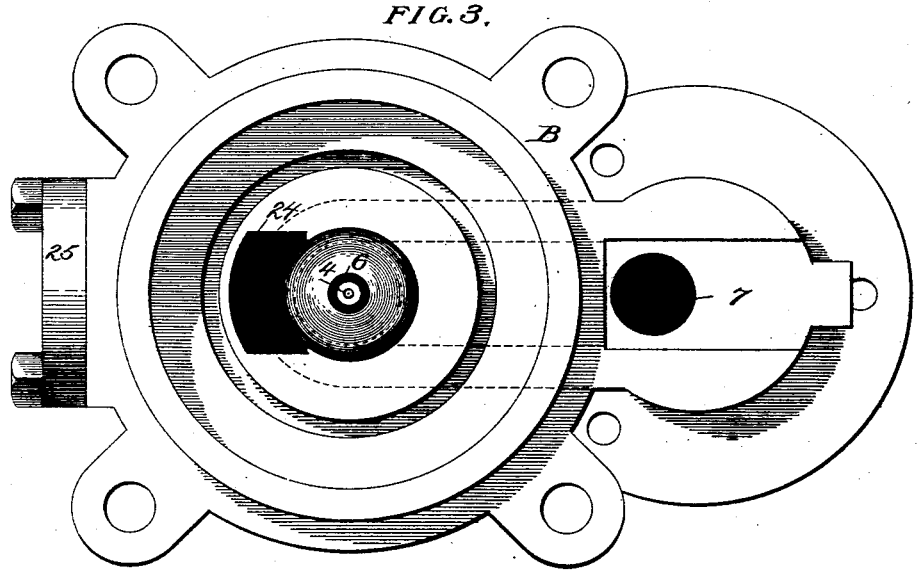
Witnesses:
Edwin L. Bradford
Geo. M. Copenhaver.
Inventor:
Julius Leede
by V. D. Stockbridge
Attorneys.

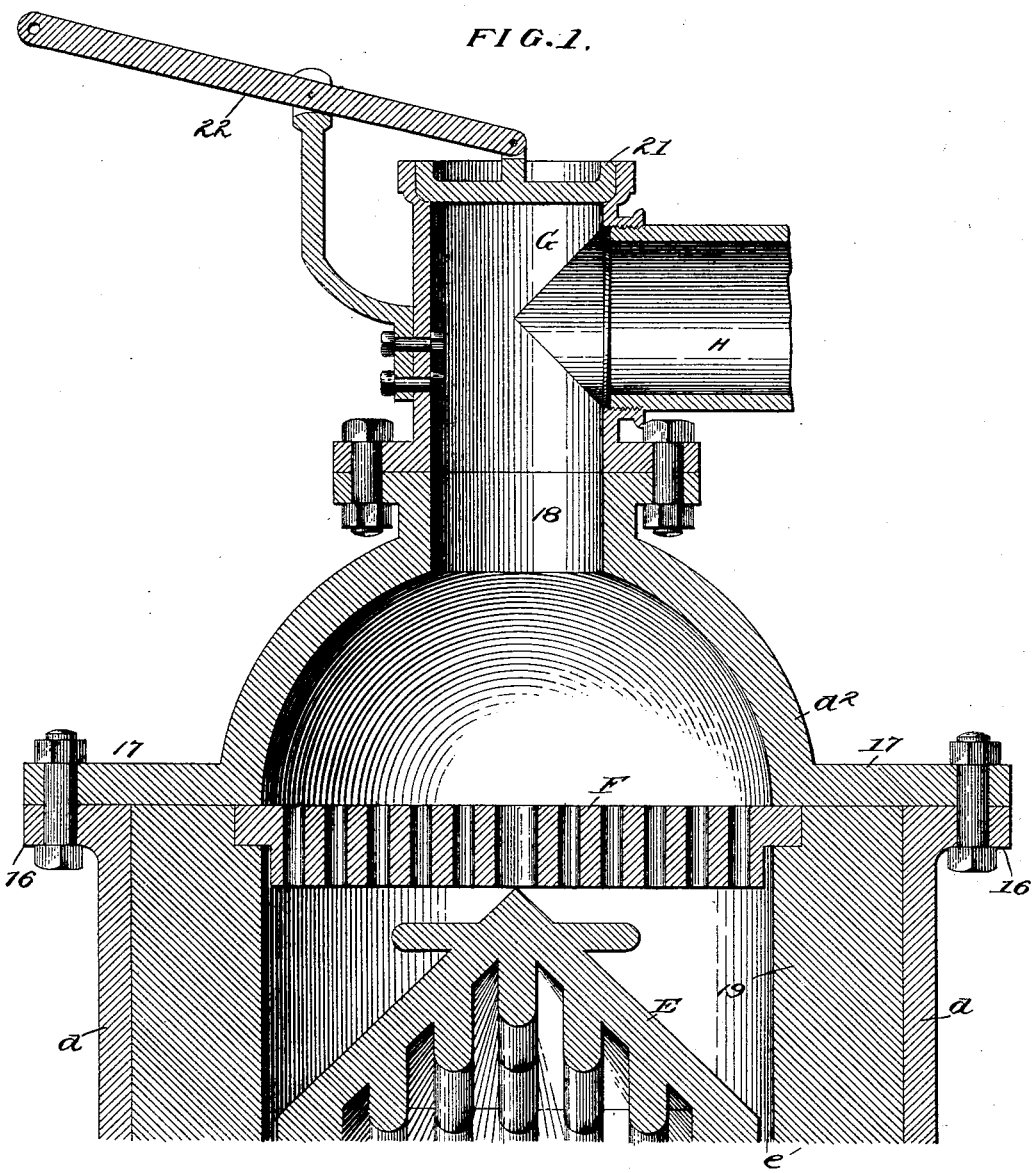

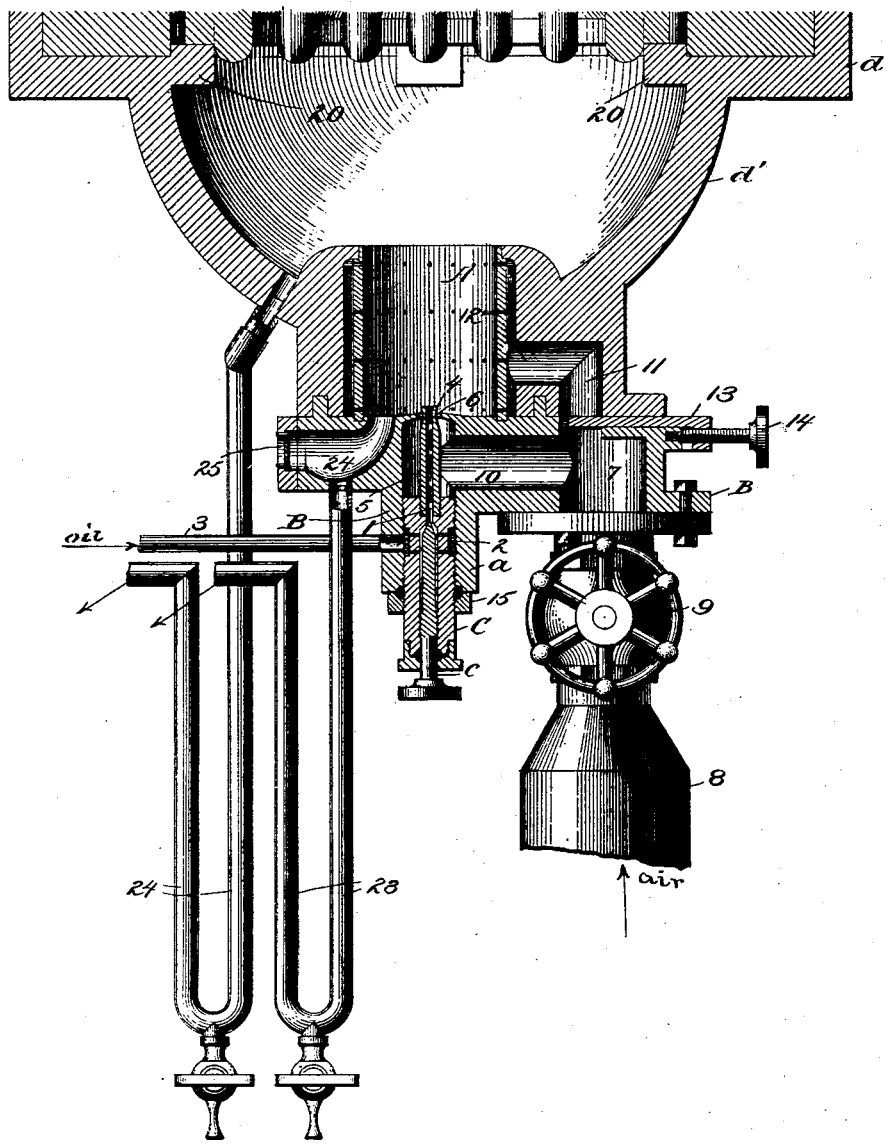

UNITED STATES PATENT OFFICE.

JULIUS LEEDE, OF MINNEAPOLIS, MINNESOTA.

GAS APPARATUS.

SPECIFICATION forming part of Letters Patent No. 588,154, dated August 17, 1897.

Application filed September 27, 1895. Renewed January 22, 1897. Serial No. 620,285. (No model.)

*To all whom it may concern:*

Be it known that I, JULIUS LEEDE, a citizen of the United States, residing at Minneapolis, in the county of Hennepin and State of Minnesota, have invented certain new and useful Improvements in Gas Apparatus; and I do hereby declare the following to be a full, clear, and exact description of the invention, such as will enable others skilled in the art to which it appertains to make and use the same.

My invention relates to improved apparatus for the manufacture of gas for heating and other purposes directly from petroleum and like liquid hydrocarbons by first raising a mass of refractory material to incandescence and then passing the products of imperfect combustion through the incandescent mass, whereby decomposition of the carbon dioxid and water of the volume is effected and new combinations of carbon monoxid and carbureted hydrogen are formed. Heretofore in the manufacture of gas according to this process the deposit in the retort of the heavy constituents of the oil has seriously impaired the successful continuous operation of the apparatus. A principal object of my invention is to overcome this difficulty.

The invention consists, essentially, in means for separating and removing the heavy unconsumed products from the apparatus during the gas-making process with the view of avoiding interruption of the process of making gas and of saving and utilizing material. In the production of gas from crude petroleum or from the products of petroleum by the process herein contemplated the oil is introduced to a combustion-chamber in an atomized condition by means of a blast of air around a jet or contracted nozzle. The means for regulating and controlling the supply of oil for delivering and regulating the atomizing-blast and for regulating the supply of air through the furnace-walls also constitute features of my invention.

Other features of invention will be hereinafter described and specifically claimed.

In the drawings, Figures 1 and 1ª are sectional views through the upper and lower portions of the apparatus, the two views together representing a complete vertical section through the axis of the apparatus. Figs. 2 and 3 are respectively side elevation and top plan of the base of the apparatus.

A is a primary combustion-chamber of vertical cylindrical form, closed at the bottom by a base-plate B, formed with oil and air passages, to which supply-pipes are connected, and provided with valves or cut-offs for regulating and controlling the supply of oil and air. Depending from the base-plate B centrally below the primary combustion-chamber is a hollow boss or projection $a$, internally screw-threaded and fitted with a threaded valve-plug C, vertically adjustable therein. This plug carries a needle-valve $c$, which controls the flow of oil through contracted passage 1, and it has an external circumferential groove which, with the wall of the sustaining-boss, forms an annular chamber 2, which communicates through radial passages in said plug and chamber around the needle-valve $c$ with contracted passage 1.

An oil-supply pipe 3 conducts oil to annular chamber 2, the oil passing therein through radial passages to the contracted passage 1, the flow being regulated by adjustment of needle-valve $c$. A nozzle 4 projects from the valve-plug C upward through chamber 5, forming a continuation for the contracted passage 1 to conduct the oil to the bottom of the primary combustion-chamber A. The end of the nozzle 4 is grooved or cut away, as shown, and forms a regulating-valve to contract or enlarge the air-passage 6 from chamber 5 to primary combustion-chamber.

7 is an air-chamber formed in or attached to the base-plate B. This chamber is coupled with a source of air-supply under pressure, as a pump or reservoir 8, the volume being regulated in part by valve 9. Passage 10 leads from chamber 7 through chamber 5 and passage 6 to the bottom of primary combustion-chamber, and passage 11 leads from chamber 7 to the annular chamber 12, surrounding the combustion-chamber.

The supply of air through the base of the combustion-chamber is partly regulated through the medium of nozzle 4, which is vertically adjustable by the valve-plug C, and the supply of air through the passage 11 is regulated by slide or cut-off 13, operated by means of thumb-screw 14. The valve-plug C is held in adjusted position by means of jam-nut 15.

The walls of the combustion-chamber A are perforated, as shown, so that the air-supply to annular chamber 12 passes laterally into the combustion-chamber and serves to retard the upward blast therethrough. The main retort is preferably cast in two parts, divided horizontally, the parts being provided with outwardly-projecting flanges 16 17, so that the parts may be conveniently bolted together, as shown. The lower casting comprises a cylindrical body part $d$ and a hemispherical bottom $d'$, preferably cast integral with the walls of the combustion-chamber A. The upper part $d^2$ of the retort comprises a hemispherical cap or cover formed with a central outlet-passage 18. The cylindrical body portion $d$ is larger in diameter than the bottom part $d'$, the two being united by a horizontal ledge which forms a supporting-base for a fire-brick lining 19. Approximately in the plane in which the bottom $d'$ begins to round inward are a series of inwardly-projecting lugs 20, which together form supports for a hollow cone E, molded from suitable refractory material, as fire-clay. The diameter of the cone is somewhat less than the interior of the retort to leave an annular space $e$ between the two for the passage of ascending gases. The space below the cone forms what may be called a "decomposing-chamber," it being the space wherein the reactions take place between the different products of the imperfect combustion of the carbonaceous materials to produce inflammable gases. The cone E, heated by the products of combustion in the combustion-chamber, becomes incandescent, indicating that the heat in the decomposing-chamber is above 1,200° Fahrenheit. Above the cone is a perforated diaphragm F, also of refractory material, which also becomes heated to incandescence. The object of the cone and diaphragm is to indicate a high degree of heat to assist in maintaining a degree of heat in all parts of the retort or chamber sufficient to decompose and cause to be recombined the constituents of the products of incomplete combustion of carbonaceous materials. A further object is to obstruct the upward passage of the gases to give time for the reactions to take place. The cap or cover $d^2$ is surmounted by a dome G. This dome is provided at the top with a valve 21, which is operated by a lever 22, fulcrumed in a bracket arm or standard, as shown.

A pipe or conduit H leads from the dome to conduct the gas to holder or service in the usual way.

Referring now to Fig. 1ª, 23 is a U-pipe, one end of which is connected with the base-plate B and forms the outlet from a trap 24, formed in the base-plate. Around the center of the base-plate, through which the oil is delivered to the combustion-chamber, the base is slightly raised to form a shallow annular channel. In this channel heavy unconsumed oil or undecomposed residuum is precipitated, whence it flows through trap 24 to U-pipe 23. The member of the U-pipe on the discharge side of the return-bend should be of a height to effectually check and prevent the escape of gas from the retort by reason of pressure from within. The upper end or mouth of the combustion-chamber A projects up into the decomposing-chamber to form an annular channel or gutter for the collection of unconsumed or residual matter. The heavy oil or residuum from this channel is drawn off through U-pipe 24 similar to pipe 23. These pipes 23 and 24 are provided at their bend or lowest points with cocks to enable them to be cleaned. The igniting-port 25 is provided with a cover for closing the same, and said cover is provided with a peep-hole for observation purposes. The cover is suitably hinged to enable it to be thrown aside while igniting the oil-spray.

In operation, oil being supplied through pipe 3 and air being discharged under pressure to chamber 7 and the nozzle 4 being adjusted to the proper position, needle-valve $c$ is opened to admit oil. The oil is atomized by air-blast through 6 and discharged into combustion-chamber. It is then ignited through port 25, after which the port is closed. The apparatus and process being now started, the slide-valve or cut-off 13 is adjusted to admit such volume of air into annular chamber as will support complete combustion. This is continued for a few minutes, the valve 21 being open until the decomposing-chamber, its walls, and the cone have become heated to incandescence, when the valve or cut-off 13 or the oil-feed is changed so that imperfect combustion only takes place. Then the valve 21 is closed and the product of the apparatus is conducted away through conduit H. The heavy products which are not consumed or decomposed are precipitated in the channels or gutters at the bottom of the combustion-chamber and decomposing-chamber and drawn off through the U-pipes and thereby saved for use as a lubricant or other purpose and clogging the retort with said product with consequent interruption of the process is prevented. By a proper manipulation of the valves to regulate the supply of oil relatively to the supply of air the product may be either an illuminating-gas or a heating-gas only.

Having now described my invention, what I claim is—

1. In gas apparatus, the combination of a combustion-chamber, a decomposing-chamber above the combustion-chamber, an oil-injector and means for collecting and withdrawing the precipitated residuum, substantially as described.

2. The combination of a combustion-chamber arranged to discharge the products of combustion upwardly provided with axial and annular passages, an oil-injector and means for trapping and collecting precipitated residuum.

3. In gas apparatus having decomposing and combustion chambers arranged one above the other and so that the flame and products of combustion ascend, the combination of said chambers, channels or gutters in the bottom thereof, an oil-injector and pipes or conduits for automatically discharging precipitated residuum, substantially as described.

4. The combination of a vertically-arranged combustion-chamber, an oil-feed leading axially through the bottom of said chamber, an air-feed leading through the bottom and sides of said chamber and a channel or depression for collecting precipitated residuum, substantially as described.

In testimony whereof I affix my signature in presence of two witnesses.

JULIUS LEEDE.

Witnesses:
F. C. O'HOLLAREN,
C. F. ROBERTSON.